(12) United States Patent
Voshi et al.

(10) Patent No.: US 9,401,840 B2
(45) Date of Patent: Jul. 26, 2016

(54) QUALITY CHECK IDENTIFYING SOURCE OF SERVICE ISSUE

(71) Applicant: ARRIS Solutions, Inc., Suwanee, GA (US)

(72) Inventors: Varad V. Voshi, Portland, OR (US); Harindranath P. Nair, Hillsboro, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 65 days.

(21) Appl. No.: 14/307,569

(22) Filed: Jun. 18, 2014

(65) Prior Publication Data

US 2014/0369208 A1    Dec. 18, 2014

Related U.S. Application Data

(60) Provisional application No. 61/836,396, filed on Jun. 18, 2013.

(51) Int. Cl.
| | |
|---|---|
| *H04L 12/26* | (2006.01) |
| *H04L 12/24* | (2006.01) |
| *H04L 12/28* | (2006.01) |
| *H04M 3/22* | (2006.01) |
| *H04M 3/30* | (2006.01) |
| *H04L 12/64* | (2006.01) |

(52) U.S. Cl.
CPC .......... *H04L 41/06* (2013.01); *H04L 12/2801* (2013.01); *H04L 12/6418* (2013.01); *H04L 41/0677* (2013.01); *H04L 43/50* (2013.01); *H04M 3/2227* (2013.01); *H04M 3/304* (2013.01); *H04M 3/306* (2013.01)

(58) Field of Classification Search
CPC ............ H04J 45/28; H04J 3/14; H04L 43/50; H04L 43/00; H04L 12/26
See application file for complete search history.

(56) References Cited

U.S. PATENT DOCUMENTS

| | | | |
|---|---|---|---|
| 2007/0019557 A1 | 1/2007 | Catter et al. | |
| 2008/0030202 A1* | 2/2008 | Wang | H04M 3/085 342/533 |
| 2008/0267215 A1 | 10/2008 | Blackburn et al. | |
| 2009/0164550 A1* | 6/2009 | Rahrer | H04L 41/0677 709/202 |
| 2009/0285575 A1* | 11/2009 | Abidi | H04J 3/1611 398/12 |
| 2010/0036939 A1* | 2/2010 | Yang | H04L 12/2697 709/224 |

(Continued)

OTHER PUBLICATIONS

PCT Search Report & Written Opinion, RE: Application No. PCT/US2014/042874; dated Nov. 3, 2014.

*Primary Examiner* — Andrew Lee
(74) *Attorney, Agent, or Firm* — Bart A. Perkins

(57) ABSTRACT

A quality check of service received by a CPE device within a first customer premise is initiated, and if the results of the quality check indicate a problem with the service received by the CPE device, one or more CPE devices within one or more customer premises sharing upstream network resources with the first customer premise is identified and a quality check of service received by the one or more identified CPE devices can be conducted. If the results of the quality check of the one or more identified CPE devices indicate a problem with the service received by the CPE devices, a determination can be made that a problem exists at a network component upstream from the first customer premise and the other one or more customer premises.

14 Claims, 6 Drawing Sheets

(56) References Cited

U.S. PATENT DOCUMENTS

| | | | | |
|---|---|---|---|---|
| 2010/0195817 A1* | 8/2010 | Cendrillon | ............... | H04B 3/32 379/406.06 |
| 2010/0223650 A1* | 9/2010 | Millet | ................. | H04L 41/0631 725/111 |
| 2011/0058502 A1* | 3/2011 | Feng | ................... | H04M 11/062 370/255 |
| 2012/0121073 A1* | 5/2012 | Glass | ..................... | G08B 25/08 379/39 |
| 2013/0291034 A1* | 10/2013 | Basile | .................. | H04N 17/004 725/107 |
| 2014/0270095 A1* | 9/2014 | Bowler | ................ | H04Q 3/0075 379/22.03 |
| 2014/0280899 A1* | 9/2014 | Brewster, Jr. | ........... | H04L 43/50 709/224 |
| 2015/0189075 A1* | 7/2015 | Hwang | ................... | H04M 3/30 379/1.03 |
| 2015/0244580 A1* | 8/2015 | Saavedra | ............ | H04L 41/0816 709/221 |

* cited by examiner

US 9,401,840 B2

QUALITY CHECK IDENTIFYING SOURCE OF SERVICE ISSUE

CROSS REFERENCE TO RELATED APPLICATION

This application is a non-provisional application claiming the benefit of U.S. Provisional Application Ser. No. 61/836,396, entitled "Identifying Home/External Issues for Installation Quality," which was filed on Jun. 18, 2013, and is incorporated herein by reference in its entirety.

TECHNICAL FIELD

This disclosure relates to checking the quality of a service at a customer premise.

BACKGROUND

Multiple services operators (MSO) use network infrastructure for carrying data traffic, television content signals, voice, video-on-demand (VoD), among other types of signals to a subscriber. Maintaining service at a customer premise can involve a technician visit to the customer premise. MSOs may use quality checks for installations and repairs completed by install and repair technicians. These quality checks can be performed using a client device such as a portable computer, mobile device, tablet, and others in conjunction with a network monitoring service, and produce a birth certificate as proof of a good quality installation or repair. MSOs may require a successful quality check as a precondition for closing an install or repair work-order, or penalize installers for an installation or repair that does not pass quality checks.

A problem found during an installation or repair may be due to an issue within the customer premise, or may be due to a wider plant problem affecting multiple subscribers. The install and repair technician is however not equipped to address problems with the outside plant. Therefore, when a technician comes across a plant problem when installing or repairing service at a customer premise, time may be wasted in trying to identify and troubleshoot an issue within the customer premise that may or may not exist.

BRIEF DESCRIPTION OF THE DRAWINGS

Like reference numbers and designations in the various drawings indicate like elements.

DETAILED DESCRIPTION

It is desirable to improve upon methods and systems for conducting a quality check of a service at a customer premise. Methods and systems are described herein for conducting a quality check of a service at a customer premise and identifying the source of a problem with the service. In embodiments, systems and methods can operate to provide the option to check the quality of a service at a neighboring customer premise when a quality check on an installation or service job fails at a first customer premise. The result of a check of a service at the neighboring customer premise can be used in the determination of whether a service issue exists within the first customer premise or whether a service issue exists at a component, device or service upstream from the first customer premise.

Figure 1:
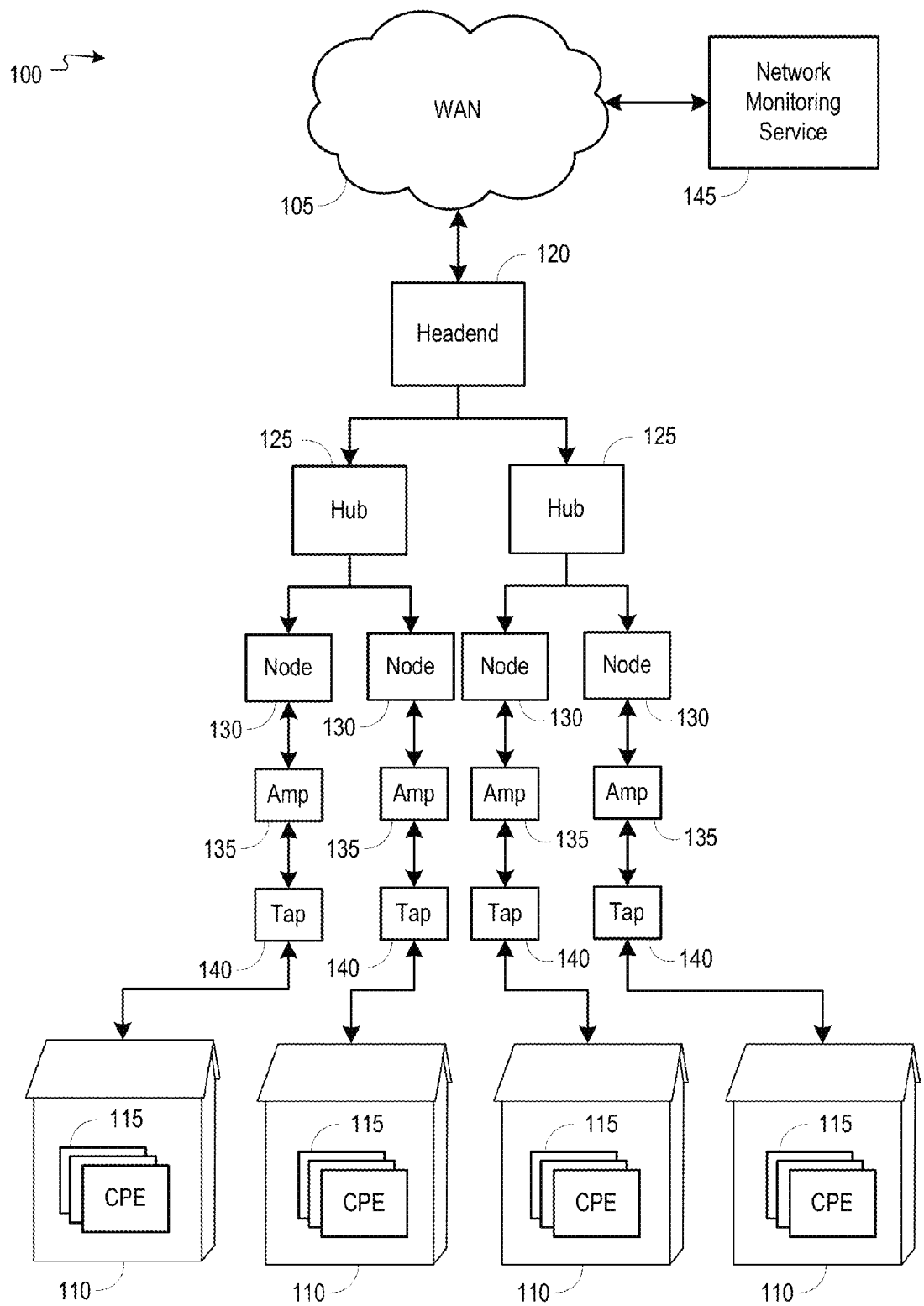
FIG. 1 is a block diagram illustrating an example network environment operable to facilitate a quality check of a service, the quality check being operable to identify a source of a service issue.

FIG. 1 is a block diagram illustrating an example network environment 100 operable to facilitate a quality check of a service, the quality check being operable to identify a source of a service issue. In embodiments, video, data, and/or voice services can be delivered to a subscriber from a wide area network (WAN) 105. A subscriber can receive the services at a customer premise 110 through one or more customer premise equipment (CPE) devices 115 (e.g., set-top box (STB), gateway, modem, and other devices that are not shown such as a wireless router including an embedded modem, digital subscriber line (DSL) modem, voice over internet protocol (VOIP) terminal adapter, video game console, digital versatile disc (DVD) player, communications device, hotspot device, etc.).

In embodiments, the CPE devices 115 can communicate with the WAN 105 through a connection to a network (e.g., a local area network (LAN), a wireless local area network (WLAN), a personal area network (PAN), etc.). In embodiments, communications between the WAN 105 and the CPE devices 115 can be routed through one or more of various network components including, but not limited to, a headend 120, hub(s) 125, node(s) 130, amplifier(s) 135, tap(s) 140, as well as others.

In embodiments, a subscriber can receive and request services using a client device (e.g., computer, television, mobile device, tablet, etc.). In embodiments, a quality check of a service at a customer premise 110 can be initiated through a client device connected to a CPE device 115 within the customer premise 110. For example, a client device can connect to upstream networks, services, and/or servers through a connection to a CPE device 115. If the connection between a CPE device 115 in a customer premise 110 and an upstream network is insufficient to permit a client device to initiate a quality check at the customer premise 110, the client device can connect to an upstream network, service, and/or server through a different path (e.g., a connection to WLAN or PAN that is external to the customer premise 110, a connection to a cellular network such as 3G or 4G LTE, and others).

In embodiments, a client device can be used to measure properties of a connection (e.g., upstream and/or downstream signal-to-noise (SNR) ratio, codeword error ratio (CER), power, etc.) between a CPE device 115 and an upstream network, component, device or service, and the measured properties can be compared to predetermined threshold ranges. When a measured connection property is outside of an acceptable or predetermined threshold range, the client device can be used to measure properties of a connection between a CPE device 115 at a neighboring customer premise and an upstream network, component, device or service that is used by both CPE devices, and the measured properties can be compared to predetermined threshold ranges. A neighboring customer premise can be a customer premise 110 that is served by at least one network component (e.g., a headend 120, hub(s) 125, node(s) 130, amplifier(s) 135, tap(s) 140, as well as others) that also serves the customer premise 110 for which a quality check is initiated (e.g., the customer premise at which service is being installed or repaired by a technician or installer). If the measured properties at the neighboring customer premise has similar issues as the measured properties at the first customer premise, the determination can be made that an issue exists upstream from the customer premise (e.g., at a tap 140, amplifier 135, node 130, hub 125, headend 120, and/or any other upstream component shared by both customer premises). If the measured properties at the different customer premise are within acceptable or predetermined threshold ranges, the determination can be made that an issue exists within the first customer premise. It should be understood that a quality check of a service at the customer premise 110 can be initiated and carried out by a remote service or server (e.g., network monitoring service 145).

In embodiments, one or more devices sharing an upstream network, component, device or service with the CPE device at issue can be identified by an upstream service or server (e.g., network monitoring service 145). For example, when an issue is discovered with respect to a CPE device 115 at a first customer premise 110, one or more other CPE devices 115 at one or more neighboring customer premises 110 can be identified by the network monitoring service 145. In embodiments, a neighboring customer premise 110 can be identified using physical information (e.g., street address information or geographical coordinates) and/or network location information (e.g., specific network components serving the customer premise). For example, the network monitoring service 145 can identify a customer premise 110 having the closest numerical street address to the numerical street address of the first customer premise 110 at issue.

In embodiments, the network monitoring service 145 can perform a quality check of services at the identified neighboring customer premise 110 (e.g., through CPE device(s) 115 at the neighboring customer premise 110), and can output a summary of the results of the quality check to a client device that is being used to check the service quality at the first customer premise 110 at issue. For example, an aggregated summary of the results of the quality check of services at the neighboring customer premise 110 can be presented to an installer or technician, and the installer or technician can determine whether the results indicate a larger plant problem. Based on the determination whether an issue exists upstream from the customer premise 110 or the issue is localized at the first customer premise 110, the technician or installer can end an installation or service work order at the customer premise 110 or can continue troubleshooting a localized issue at the customer premise 110. For example, when the results of the service quality check at the neighboring customer premise 110 suggest an issue at the neighboring customer premise 110 as well (e.g., the results show similar problems existing at the first customer premise 110 and the neighboring customer premise 110), the installer or technician can be allowed to close a work order associated with the first customer premise 110 and can also capture the results of the failed quality check at the neighboring customer premise 110.

In embodiments, when the service quality check at the neighboring customer premise 110 fails, a determination can be made that an issue exists upstream from the first customer premise 110 and the neighboring customer premise 110 (e.g., an issue exists at one or more upstream plant components) and the network monitoring service 145 can create a ticket for a plant technician to address the upstream issue that caused the failed service quality check at the customer premises 110. In embodiments, an upstream application can be used by a service operator to run service checks at one or more CPE devices 115 and/or one or more customer premises 110 that share an upstream network, component, service, and/or device with the customer premise 110 at which a failed quality check is detected.

In embodiments, when a service quality check is performed for a customer premise, a media access control (MAC) address associated with a CPE device 115 installed within a customer premise 110 can be identified by an upstream server or service (e.g., network monitoring service 145). In embodiments, an upstream server or service (e.g., network monitoring service 145) can identify one or more network elements (e.g., headend 120, hub(s) 125, node(s) 130, amplifier(s) 135, tap(s) 140, channels, service groups, and other components or services that serve a customer premise 110) associated with a customer premise 110 for which a service quality check is being performed. The upstream server or service (e.g., network monitoring service 145) can then identify one or more other CPE devices 115 that share one or more network elements with the CPE device 115 for which a service quality check is being performed. For example, if a node 130 associated with a CPE device 115 at a first customer premise 110 is known, the network monitoring service 145 can identify a CPE device 115 at a neighboring customer premise 110 that shares the same node 130.

In embodiments, subscriber location elements (e.g., geographical coordinates such as latitude and longitude, the street address, city, state, zip code, and other address location information associated with a customer premise 110 at which one or more CPE devices 115 are installed) can be made available to the network monitoring service 145, and the network monitoring service 145 can use subscriber location elements to identify a subset of CPE devices 115 having one or more network elements in common with a CPE device 115 for which a service quality check is being performed. For example, the network monitoring service 145 can identify one or more neighboring CPE devices 115 (e.g., CPE devices sharing one or more subscriber location elements with a CPE device for which a service quality check is being performed). In embodiments, neighboring CPE devices can be CPE devices 115 having geographical coordinates within a threshold range of geographical coordinates associated with a CPE device 115 for which a service quality check is being performed. In embodiments, neighboring CPE devices can be CPE devices 115 having subscriber location elements with the same street name, city, state, and/or door numbers within a predetermined range of the respective subscriber location elements of a CPE device 115 for which a service quality check is being performed. Subscriber location elements associated with one or more CPE devices 115 can be stored by a service operator and made available to a network monitoring service 145, or can be sent to the network monitoring service 145 through a CPE device 115 during installation or maintenance of the CPE device 115.

In embodiments, the network monitoring service 145 can collect data from an identified subset of CPE devices 115, and can perform the same quality check on the subset of CPE devices as the quality check performed on the CPE device that is being installed or repaired. If the summary of the quality checks on the subset of CPE devices shows substantially the same failure(s) as the quality check on the CPE device being installed or repaired, the network monitoring service 145 can save the results of the quality check on the CPE devices (e.g., the results can be saved as a birth certificate associated with the CPE device(s)). In embodiments, a service operator can run periodic reports on the newly created birth certificates (e.g., the results of the quality check at the CPE device being installed and the subset of neighboring CPE devices), and can identify the CPE device and neighboring CPE devices as candidates for plant maintenance. In embodiments, the network monitoring service 145 can create a ticket with an alarm management or ticketing system associated with the CPE device being installed or repaired and the neighboring subset of CPE devices.

Figure 2:
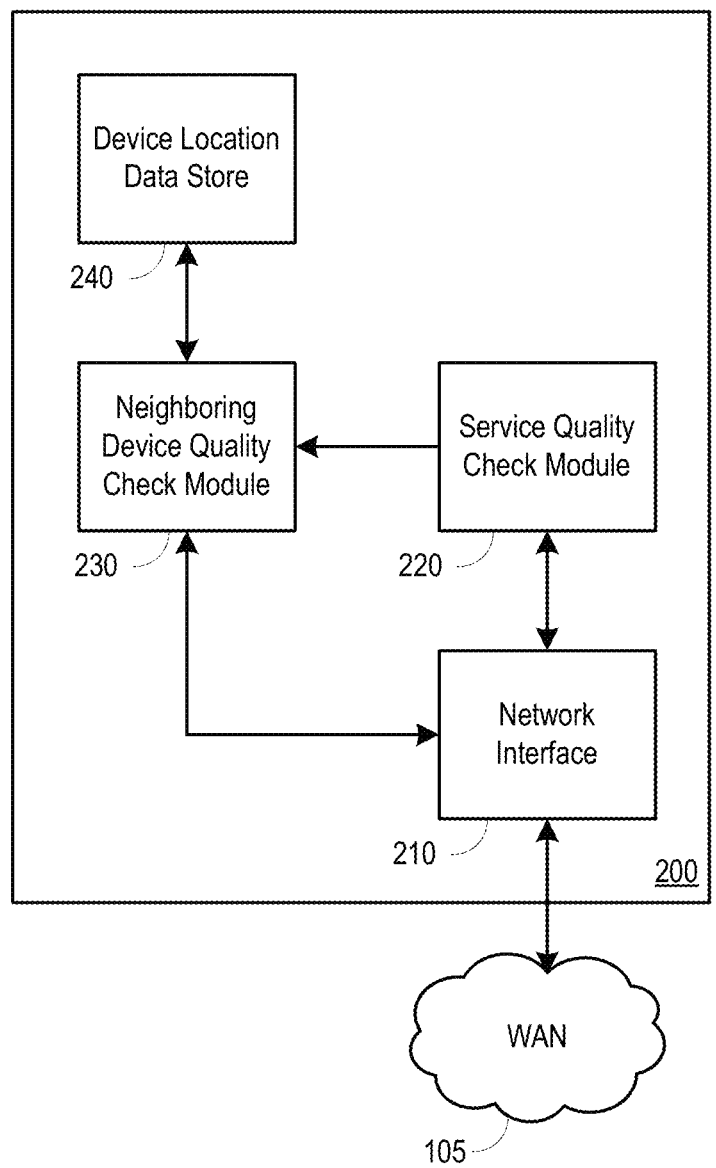
FIG. 2 is a block diagram illustrating an example device operable to facilitate a quality check of a service, the quality check being operable to identify a source of a service issue.

FIG. 2 is a block diagram illustrating an example component 200 operable to facilitate a quality check of a service, the quality check being operable to identify a source of a service issue. The component 200 can include a network interface 210, a service quality check module 220, a neighboring device quality check module 230, and a device location data store 240. In embodiments, the component 200 is within a network monitoring service 145 of FIG. 1. In embodiments, the component 200 can receive a request for a service quality check and/or location data associated with a CPE device 115 within a customer premise 110.

In embodiments, the service quality check module 220 can identify a CPE device 115 associated with a received request for a service quality check and can measure properties of a connection (e.g., upstream and/or downstream signal-to-noise (SNR) ratio, codeword error ratio (CER), power, etc.) between the CPE device 115 and an upstream network, component, device or service, and the measured properties can be compared to predetermined threshold ranges. When a measured connection property is outside of an acceptable or predetermined threshold range, the service quality check module 220 can output identification, network element, and/or location information associated with the CPE device 115 to the neighboring device quality check module 230.

In embodiments, the neighboring device quality check module 230 can identify one or more neighboring CPE devices based upon network element (e.g., network components serving the CPE device such as headend, nodes, hubs, amplifiers, taps, etc.) and/or location information (e.g., geographical coordinates such as latitude and longitude, the street address, city, state, zip code, and other address location information) associated with the CPE device from which a service quality check request is received. The neighboring device quality check module 230 can compare the network element and/or location information associated with the CPE device requesting a service quality check to network element and/or location information associated with one or more other CPE devices. For example, network element and/or location information associated with one or more CPE devices can be stored at the device location data store 240. In embodiments, the neighboring device quality check module 230 can identify the following devices as neighboring CPE devices: CPE devices being served by at least one upstream network component that also serves the CPE device requesting a service quality check; CPE devices having geographical coordinates within a threshold range of geographical coordinates associated with the CPE device requesting a service quality check; CPE devices having subscriber location elements with the same street name, city, state, and/or door numbers within a predetermined range of the respective subscriber location elements of the CPE device requesting a service quality check; as well as other CPE devices having network location and/or physical location elements in common with the CPE device requesting a service quality check.

In embodiments, the neighboring device quality check module 230 can measure properties of a connection between one or more neighboring CPE devices and an upstream network, component, device or service, and the measured properties can be compared to predetermined threshold ranges. If the measured properties at a predetermined number of neighboring CPE devices (e.g., a certain number of devices or a certain percentage of measured devices) have similar issues as the measured properties at the requesting CPE device, the determination can be made that an issue exists upstream from the customer premise associated with the requesting CPE device, and the component 200 can output a message informing an installer or technician that an issue with a service received by the CPE device is due to a problem with a network component upstream from the CPE device. If the measured properties at a predetermined number of neighboring CPE devices are within acceptable or predetermined threshold ranges, the determination can be made that an issue exists within the customer premise associated with the CPE device requesting the service quality check, and the component 200 can output a message informing an installer or technician that an issue with a service received by the CPE device is due to a problem within the corresponding customer premise.

Figure 3:
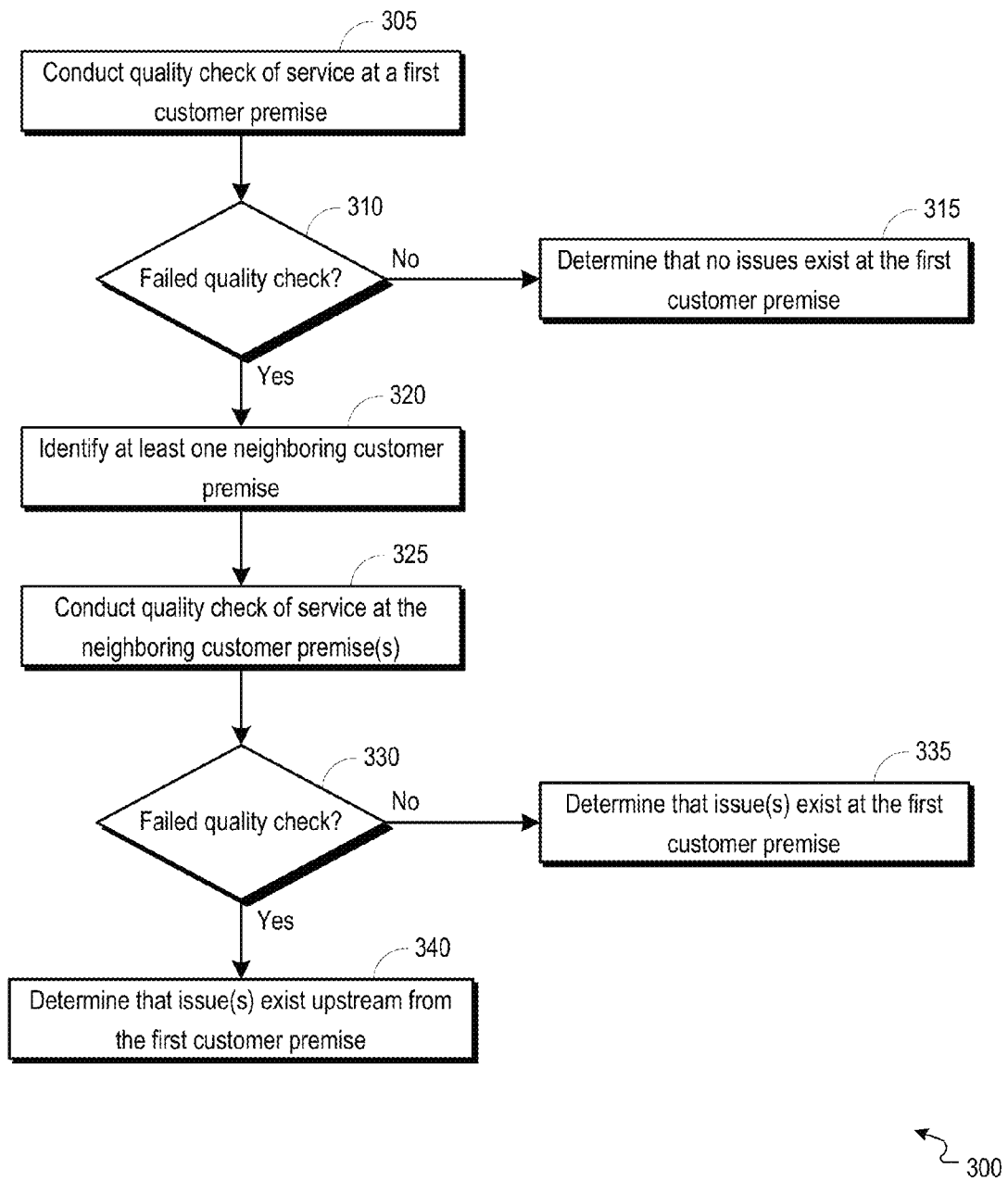
FIG. 3 is a flowchart illustrating an example process operable to facilitate a quality check of a service, the quality check being operable to identify a source of a service issue.

FIG. 3 is a flowchart illustrating an example process 300 operable to facilitate a quality check of a service, the quality check being operable to identify a source of a service issue. The process 300 can begin at 305, when a quality check of a service is conducted for a first customer premise. For example, a client device (e.g., computer, television, mobile device, tablet, etc.) can be used to initiate a quality check of a service for a CPE device 115 at a customer premise 110 of FIG. 1. A client device can be used to measure properties of a connection (e.g., upstream and/or downstream signal-to-noise (SNR) ratio, codeword error ratio (CER), power, etc.) between a CPE device 115 and an upstream network, component, device and/or service. In embodiments, a network monitoring service 145 of FIG. 1 (e.g., using component 200 of FIG. 2) can initiate a service quality check for a CPE device, and can measure connection properties at the CPE device.

At 310, a determination can be made whether the quality check of service at the first customer premise failed. The determination whether the quality check of service at the first customer premise failed can be made, for example, by a network monitoring service 145 of FIG. 1 (e.g., through a service quality check module 220 of FIG. 2). In embodiments, the service quality check module 220 can compare measured connection properties associated with a CPE device requesting a service quality check to predetermined threshold ranges. In embodiments, the determination can be made that a quality check of service at the first customer premise fails when one or more of the measured connection properties fall outside of corresponding predetermined ranges.

If, at 310, the determination is made that the quality check of service at the first customer premise does not fail, the process 300 can proceed to 315. At 315, the determination can be made that no issues exist at the first customer premise. In embodiments, a summary of results and a message informing a user (e.g., subscriber, installer, technician, etc.) that no service issues exist at the first customer premise can be output to the user.

If, at 310, the determination is made that the quality check of service at the first customer premise does fail, the process 300 can proceed to 320. At 320, at least one neighboring customer premise can be identified, wherein the neighboring customer premise(s) are customer premises having one or more CPE devices that share an upstream network, component, device, and/or system with a CPE device associated with the first customer premise. Neighboring customer premise(s) can be identified, for example, by a service or server upstream from the first customer premise (e.g., network monitoring service 145 of FIG. 1). In embodiments, the neighboring device quality check module 230 of FIG. 2 can identify neighboring customer premise(s) based upon a comparison between network element information (e.g., network components serving the customer premise(s) such as headend, nodes, hubs, amplifiers, taps, etc.) and/or location information (e.g., geographical coordinates such as latitude and longitude, the street address, city, state, zip code, and other address location information) associated with CPE device(s) within the first customer premise and CPE device(s) at one or more other customer premise(s). In embodiments, the neighboring device quality check module 230 can identify the following customer premises as neighboring customer premises: customer premises being served by at least one upstream network component that also serves the first customer premise; customer premises having geographical coordinates within a threshold range of geographical coordinates associated with the first customer premise; customer premises having subscriber location elements with the same street name, city, state, and/or door numbers within a predetermined range of the respective subscriber location elements of the first customer premise; as well as other customer premises having network location and/or physical location elements in common with the first customer premise.

In embodiments, at 320, the network monitoring service 145 can identify a predetermined number of neighboring customer premise(s) sharing various levels of network and/or physical location elements with the first customer premise. For example, the network monitoring service 145 can identify a lowest level network element (e.g., tap 140 of FIG. 1 or other low-level element) associated with the first customer premise and can identify other customer premise(s) being served by the identified network element. In embodiments, if the number of identified customer premise(s) being served by the identified network element component is less than the predetermined number of neighboring customer premise(s) to be identified, the network monitoring service 145 can identify a higher level network element (e.g., amplifier 135, node 130, hub 125, headend 120, etc.) serving the first customer premise and can identify other customer premise(s) being served by the identified higher level network element until the predetermined number of neighboring customer premise(s) is met. As another example, the network monitoring service 145 can identify a customer premise having the closest physical address (e.g., city, state, street name, house number) or geographical coordinates to the physical address or geographical coordinates of the first customer premise, and the network monitoring service 145 can continue to broaden the physical address or geographical coordinate range to identify neighboring customer premise(s) until the predetermined number of neighboring customer premise(s) is met.

At 325, a quality check of a service can be conducted for the identified neighboring customer premise(s). The quality check of a service for the identified neighboring customer premise(s) can be initiated and connection properties can be measured, for example, by the network monitoring service 145 of FIG. 1. In embodiments, a client device (e.g., computer, television, mobile device, tablet, etc.) can initiate a service quality check for the identified neighboring customer premise(s), and can measure connection properties at the neighboring customer premise(s).

At 330, a determination can be made whether the quality check of service at the identified neighboring customer premise(s) failed. The determination whether the quality check of service at the neighboring customer premise(s) failed can be made, for example, by an upstream system or server (e.g., network monitoring service 145 of FIG. 1). In embodiments, the determination can be made that a quality check of service at a neighboring customer premise fails when one or more of the measured connection properties at the neighboring customer premise fall outside of corresponding predetermined ranges. In embodiments, when a quality check of service is conducted for more than one neighboring customer premise, the determination can be made that the quality check of service for the plurality of neighboring customer premises results in a failure when more than a predetermined percentage of the identified neighboring customer premises have one or more measured connection properties falling outside of corresponding predetermined ranges.

If, at 330, the determination is made that the quality check of service at the neighboring customer premise(s) does not result in a failure, the process 300 can proceed to 335. At 335, the determination can be made that the cause of a service issue exists at the first customer premise. In embodiments, a summary of results of the quality check of service at the neighboring customer premise(s) can be output to the network monitoring service 145 of FIG. 1 and/or a client device from which the quality check of service at the first customer premise was initiated. In embodiments, a message informing a user (e.g., subscriber, installer, technician, operator, etc.) that a service issue exists at the first customer premise can be output to the user.

If, at 330, the determination is made that the quality check of service at the neighboring customer premise(s) does not result in a failure, the process 300 can proceed to 340. At 340, the determination can be made that the cause of a service issue exists upstream from the first customer premise. The determination that an issue exists at an upstream component (e.g., tap 140, amplifier 135, node 130, hub 125, headend 120, system, network, device, or other component that is upstream of the first customer premise) can be made, for example, by the network monitoring service 145 of FIG. 1. In embodiments, a summary of results of the quality check of service at the neighboring customer premise(s) can be output to the network monitoring service 145 of FIG. 1 and/or a client device from which the quality check of service at the first customer premise was initiated. In embodiments, a message informing a user (e.g., subscriber, installer, technician, operator, etc.) that the cause of a service issue exists upstream from the first customer premise can be output to the user. For example, the message can inform an installer or technician that the service issue experienced by the first customer premise is likely due to a problem with a network component upstream from the first customer premise. In embodiments, an alarm or a message informing a service operator that an issue exists upstream from the first customer premise can be output to the service operator (e.g., output to the network monitoring service 145).

Figure 4:
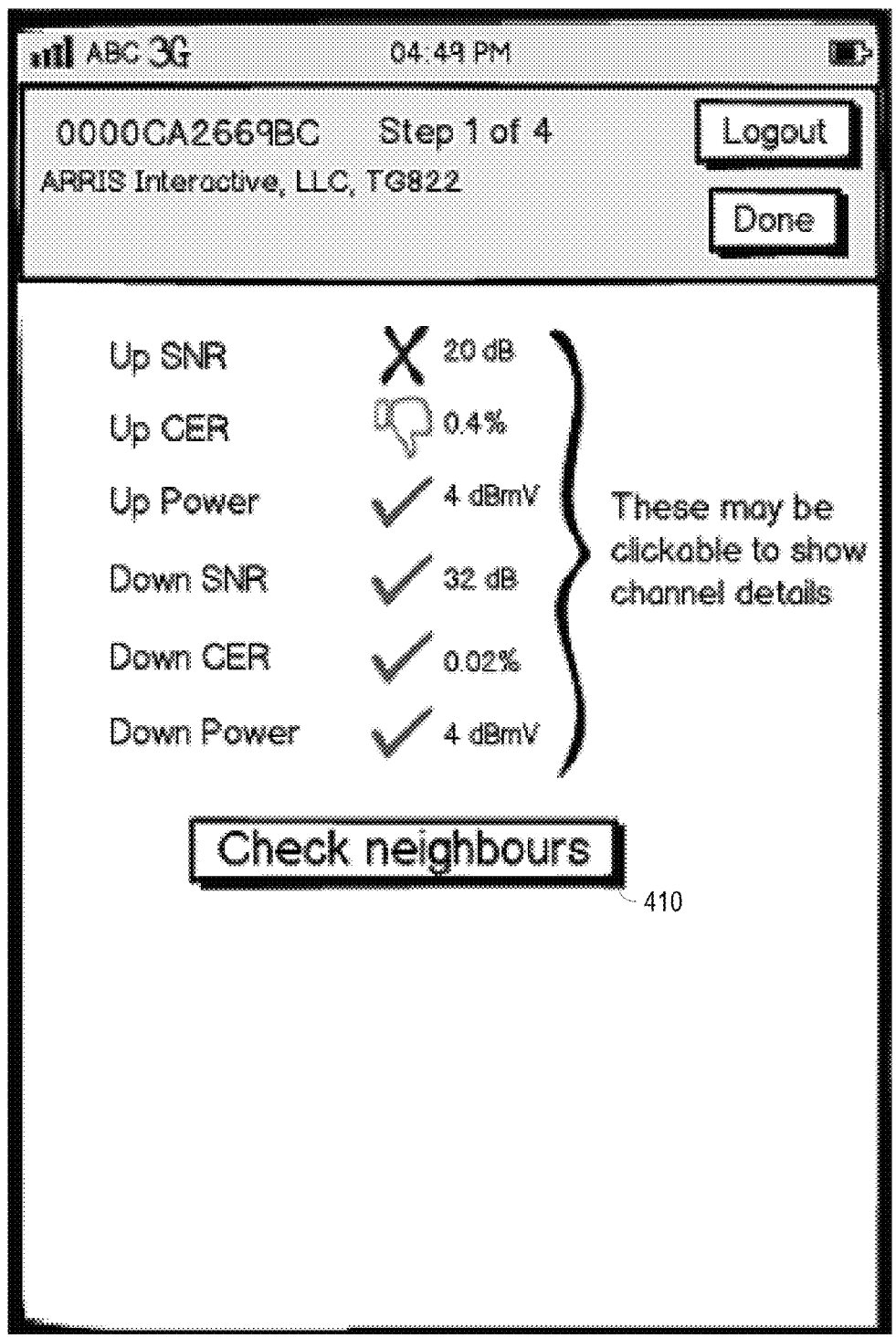
FIG. 4 is an illustration of an example user interface depicting the results of a failed service quality check.

FIG. 4 is an illustration of an example user interface 400 depicting the results of a failed service quality check for a CPE device at a first customer premise. In embodiments, when a service quality check is performed at a first customer premise and fails, a client device (e.g., mobile device, smartphone, personal digital assistant, tablet, computer, etc.) can present a user (e.g., subscriber, installer, technician, etc.) with an option to check service quality at one or more neighboring customer premises. For example, the interface 400 can present the user with a summary of the results of the service quality check at the first customer premise, the summary indicating connection property measurements that fell outside of a predetermined range, and can present the user with an option to initiate a service quality check at one or more neighboring customer premises (e.g., a clickable "check neighbors" button 410). When the user invokes the option to check service quality at neighboring premise(s), an upstream server or service (e.g., network monitoring service 145 of FIG. 1) can identify one or more CPE devices at one or more neighboring customer premises and can measure network connection properties of the identified CPE device(s).

Figure 5:
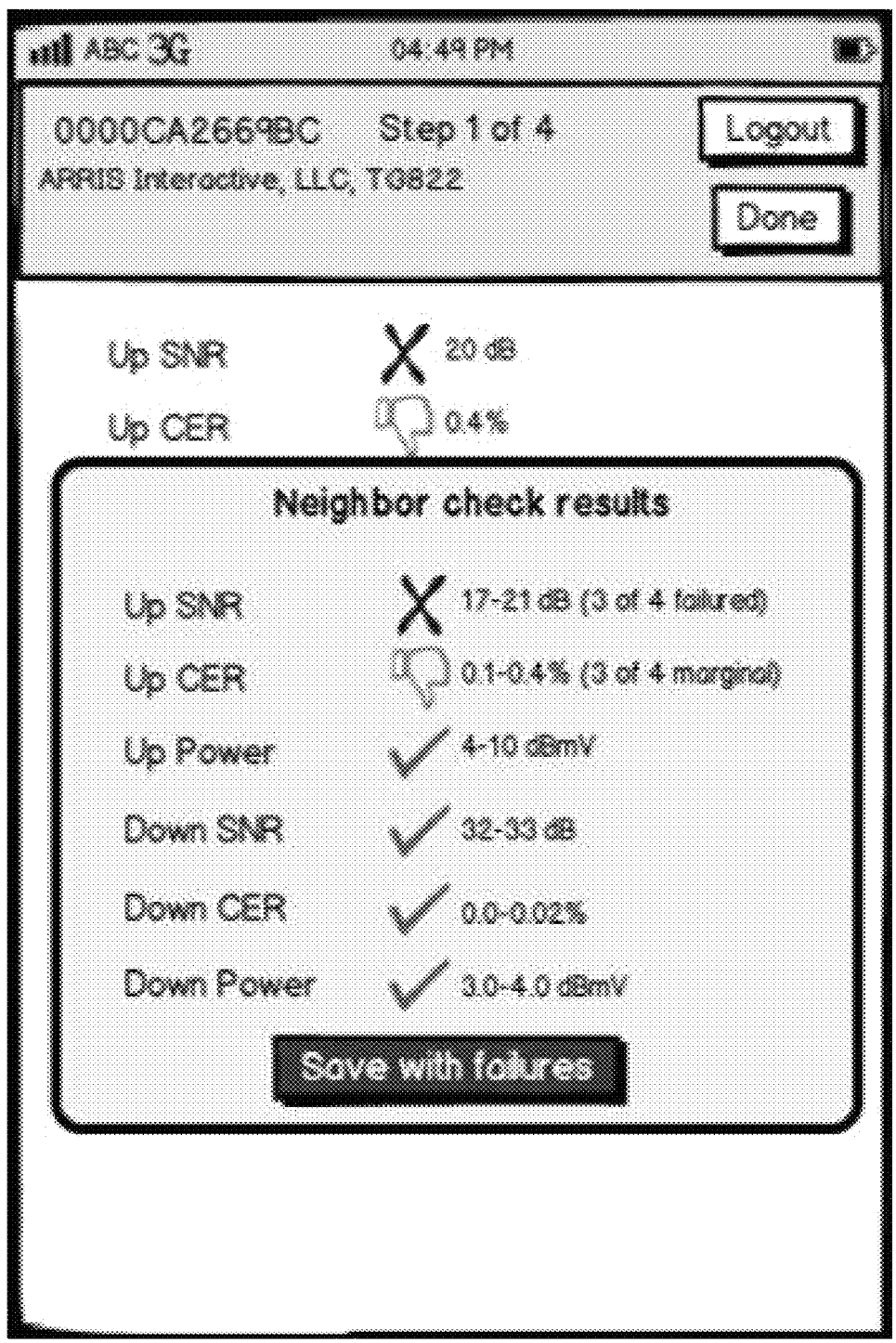
FIG. 5 is an illustration of an example user interface depicting the results of a service quality check for a neighboring customer premise.

FIG. 5 is an illustration of an example user interface 500 depicting the results of a service quality check at a neighboring customer premise. A summary of the results of a service quality check at one or more neighboring customer premises can be presented to a user (e.g., subscriber, installer, technician, etc.) on a client device (e.g., mobile device, smartphone, personal digital assistant, tablet, computer, etc.). In embodiments, when a service quality check is performed for one or more neighboring customer premises and fails, a client device can present a user with an option to save the results of the service quality check, close the work order or installation at the first customer premise, and/or output the results of the service quality check to an upstream system or server (e.g., network monitoring service 145 of FIG. 1). In embodiments, when a service quality check is performed for one or more neighboring customer premises and does not fail, a message can be output to the client device, the message instructing the user that the cause of a network connection issue at the first customer premise exists within the first customer premise.

Figure 6:
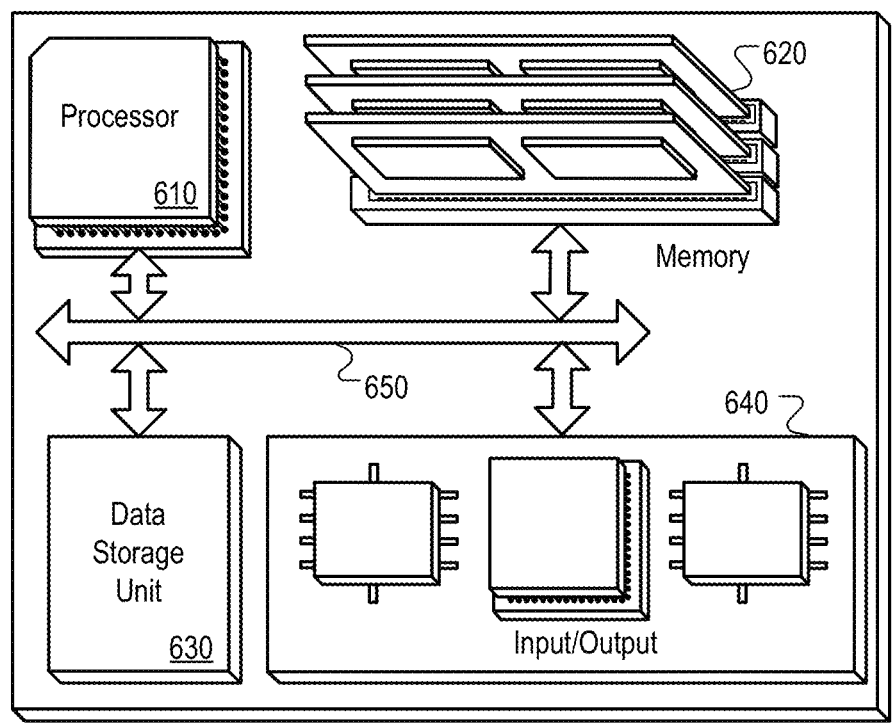
FIG. 6 is a block diagram of a hardware configuration operable to facilitate a quality check of a service, the quality check being operable to identify a source of a service issue.

FIG. 6 is a block diagram of a hardware configuration 600 operable to facilitate a quality check of a service, the quality check being operable to identify a source of a service issue. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for interfacing with a client device 135 of FIG. 1 (e.g., television, computer, tablet, mobile device, etc.). In another implementation, the input/output device can include driver devices configured to send communications to, and receive communications from one or more networks (e.g., WAN 105 of FIG. 1, or any other network such as a PAN, LAN, WLAN, cellular network, etc.).

Those skilled in the art will appreciate that the invention improves upon methods, systems and apparatuses for checking the quality of a service received by a CPE device within a customer premise. The methods, systems, and apparatuses described in this disclosure enable the identification of an issue existing at a component upstream from a customer premise by identifying a neighboring customer premise and checking the service quality at the neighboring customer premise. When a service quality check at a customer premise fails, a technician or installer can quickly determine whether further troubleshooting is necessary at the customer premise or whether the issue exists upstream from the customer premise based on the results of a service quality check at a neighboring customer premise.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    identifying a failed quality check at a first customer premise;
    identifying one or more other customer premises, wherein the one or more other customer premises each share at least one upstream network component with the first customer premise;
    conducting a quality check for the one or more other customer premises;
    if the quality check for the one or more other customer premises fails, determining that the cause of the failed quality check at the first customer premise exists at a network component upstream from the first customer premise;
    if the quality check for the one or more other customer premises passes, determining that the cause of the failed quality check at the first customer premise exists at the first customer premise;
    identifying a lowest-level network component serving the first customer premise;
    wherein the one or more identified other customer premises comprise one or more customer premises that are served by the identified, lowest-level network component;
    if the number of identified other customer premises served by the identified lowest-level network component is less than a predetermined number, identifying a higher-level network component serving the first customer premise; and
    wherein the one or more identified other customer premises comprise one or more customer premises that are served by the identified, higher-level network component.

2. The method of claim 1, wherein identifying the one or more other customer premises comprises:
    determining physical location information associated with the first customer premise; and
    identifying one or more other customer premises having physical location information comprising at least one element that is equivalent to an element of the physical location information associated with the first customer premise.

3. The method of claim 2, wherein physical location information comprises a street address or geographical coordinates.

4. The method of claim 1, wherein a plurality of other customer premises are identified, and the determination is made that the quality check for the plurality of other customer premises fails if the percentage of identified other customer premises having a failed quality check is greater than a predetermined percentage.

5. The method of claim 1, further comprising:
    if the quality check for the one or more other customer premises fails, outputting a message to a user informing the user that the cause of the failed quality check at the first customer premise exists at a network component upstream from the first customer premise; and
    if the quality check for the one or more other customer premises passes, outputting a message to the user informing the user that the cause of the failed quality check at the first customer premise exists at the first customer premise.

6. An apparatus comprising:
    a first module configured to identify a failed quality check at a first customer premise equipment device; and
    a second module configured to:
        identify one or more other customer premise equipment devices, wherein the one or more other customer premise equipment devices each share at least one upstream network component with the first customer premise equipment device;
        initiate a quality check for the one or more other customer premise equipment devices;
        if the quality check for the one or more other customer premise equipment devices fails, determine that the cause of the failed quality check at the first customer premise equipment device exists at a network component upstream from the first customer premise equipment device; and
        if the quality check for the one or more other customer premise equipment devices passes, determine that the cause of the failed quality check at the first customer premise equipment device exists at a customer premise associated with the first customer premise equipment device;

wherein the first module is further configured to:
- identify a lowest-level network component serving the first customer premise equipment device;
- wherein the one or more identified other customer premise equipment devices comprise one or more customer premise equipment devices that are served by the identified, lowest-level network component;
- identify a higher-level network component serving the first customer premise equipment device if the number of identified other customer premise equipment devices served by the identified lowest-level network component is less than a predetermined number; and
- wherein the one or more identified other customer premise equipment devices comprise one or more customer premise equipment devices that are served by the identified, higher-level network component.

7. The apparatus of claim 6, wherein physical location information associated with each of the identified one or more other customer premise equipment devices comprises at least one element that is equivalent to an element of physical location information associated with the first customer premise equipment device.

8. The apparatus of claim 6, wherein a plurality of other customer premise equipment devices are identified, and the determination is made that the quality check for the plurality of other customer premise equipment devices fails if the percentage of identified other customer premise equipment devices having a failed quality check is greater than a predetermined percentage.

9. The apparatus of claim 6, further comprising an interface configured to:
- output a message to a user informing the user that the cause of the failed quality check at the first customer premise equipment device exists at a network component upstream from the first customer premise equipment device if the quality check for the one or more other customer premise equipment devices fails; and
- output a message to the user informing the user that the cause of the failed quality check at the first customer premise equipment device exists at a customer premise associated with the first customer premise equipment device if the quality check for the one or more other customer premise equipment devices passes.

10. One or more non-transitory computer readable media having instructions operable to cause one or more processors to perform the operations comprising:
- identifying a failed quality check at a first customer premise;
- identifying one or more other customer premises, wherein the one or more other customer premises each share at least one upstream network component with the first customer premise;
- conducting a quality check for the one or more other customer premises;
- if the quality check for the one or more other customer premises fails, determining that the cause of the failed quality check at the first customer premise exists at a network component upstream from the first customer premise;
- if the quality check for the one or more other customer premises passes, determining that the cause of the failed quality check at the first customer premise exists at the first customer premise;
- identifying a lowest-level network component serving the first customer premise;
- wherein the one or more identified other customer premises comprise one or more customer premises that are served by the identified, lowest-level network component;
- if the number of identified other customer premises served by the identified lowest-level network component is less than a predetermined number, identifying a higher-level network component serving the first customer premise; and
- wherein the one or more identified other customer premises comprise one or more customer premises that are served by the identified, higher-level network component.

11. The one or more non-transitory computer-readable media of claim 10, wherein identifying the one or more other customer premises comprises:
- determining physical location information associated with the first customer premise; and
- identifying one or more other customer premises having physical location information comprising at least one element that is equivalent to an element of the physical location information associated with the first customer premise.

12. The one or more non-transitory computer-readable media of claim 11, wherein physical location information comprises a street address or geographical coordinates.

13. The one or more non-transitory computer-readable media of claim 10, wherein a plurality of other customer premises are identified, and the determination is made that the quality check for the plurality of other customer premises fails if the percentage of identified other customer premises having a failed quality check is greater than a predetermined percentage.

14. The one or more non-transitory computer-readable media of claim 10, wherein the instructions are further operable to cause one or more processors to perform the operations comprising:
- if the quality check for the one or more other customer premises fails, outputting a message to a user informing the user that the cause of the failed quality check at the first customer premise exists at a network component upstream from the first customer premise; and
- if the quality check for the one or more other customer premises passes, outputting a message to the user informing the user that the cause of the failed quality check at the first customer premise exists at the first customer premise.

* * * * *